UNITED STATES PATENT OFFICE.

OTTO E. C. GUELICK, OF DETROIT, MICHIGAN.

ARTIFICIAL STONE.

SPECIFICATION forming part of Letters Patent No. 410,688, dated September 10, 1889.

Application filed February 27, 1889. Serial No. 301,356. (No specimens.)

*To all whom it may concern:*

Be it known that I, OTTO E. C. GUELICK, a citizen of the United States, residing at Detroit, in the county of Wayne and State of Michigan, have invented a new and useful Improvement in Artificial Stone, of which the following is a specification.

This invention relates to the manufacture of artificial stone, and has for its object the production of a compound which, when mixed with cement and sand, and water either in its pure state or saturated with borax or alum, or both, will produce an artificial stone well adapted for purposes for which ordinary sandstone is used; also when mixed with cement and fine or screened sand, and water saturated with borax and alum, or both, and suitable pigments, it will produce an artificial stone in simulation of marbles or stones which are used for ornamental purposes because of their mottled colors; and the artificial marbles produced by my compound are susceptible of a high polish, equal to that of the natural stone, and take such polish under a burnisher without the use of varnish or other compound generally used to produce such a polish on artificial marbles. I employ sulphate of baryta, sometimes called "blanc fixe," also sometimes known as "heavy spar," ground to a powder, and combine with it litharge, known as "protoxite of lead," acetate of lead, and water.

In compounding this mixture I first mix with a quantity of the litharge from one to one and one-quarter per cent. of acetate of lead. Stir the two together rapidly and constantly, and while stirring add very slowly a small quantity of water. If the quantity of litharge is small, not exceeding four or five pounds, the water will be added only a few drops at a time, and the stirring will be continued until the color of the mass changes from the peculiar color of litharge to white. The time required will depend somewhat on the percentage of acetate of lead, as it will take somewhat longer to convert a mass containing only one per cent. of acetate of lead than if there be one and a quarter or one and a third per cent. I have had the best results when using about one and a quarter per cent. After these two ingredients have been mixed and stirred, as described, I mix them with ten times their weight of sulphate of baryta, incorporating them perfectly by mixing them together. This form of compound I use with cement, sand, and water in forming artificial stone, in proportions of one part of the compound to twenty parts of cement and forty of sand, and water sufficient to moisten the mass so that it will tamp well into the molds, but not sufficient to make it fluid. I use the material thus compounded to form a coating around the mold on the inside, making a hollow form of a stone in the mold, and I fill up the interior with cement, sand, and water, with which the composition first spoken of has not been mixed, the object being to produce an artificial stone of which the outside or exposed part shall have the composition as one of the ingredients, but of which the inner part is made of cheaper material. As soon as the cement sets the block is taken out of the mold and laid up to cure. It should stand for three or four days, and should be sprinkled with water each day during that time, and at the end of that time it will be ready for use, though of course it continues to grow harder and better the longer it stands.

In making stone for decorative work, which is usually made in thin slabs in a shape adapted for table-tops, mantels, or wainscoting, I mix together one part of my compound and ten parts of cement, adding such pigments as I desire. The mixture is moistened with borax and alum-water to the consistency of putty, and is then placed in the mold, masses of different colors being put in together to form a mottled appearance, in imitation of any natural marble, if it is desired. I usually make the colored or pigmented portion thin, and back up with a mixture of cement and sand moistened with water. After the material sets it is taken out of the mold and laid away to cure, and during the time it is curing it is moistened occasionally with borax and alum-water. The face of the slab thus formed is capable of a high degree of polish. If it is desired to use the slab for marbleizing under heat in the way that slate is used for that purpose, I omit the pigments, but proceed otherwise in the same way, and produce a slab of stone upon which the coating of marbleizing material is spread and baked in the ordinary way for marbleizing slate.

Having thus described my invention, what I claim as novel, and desire to have secured to me by Letters Patent, is—

1. The composition of material consisting of litharge and acetate of lead and water, in the proportions named, mixed together in the manner described, and combined with sulphate of baryta, substantially as and for the purpose described.

2. The described composition consisting of sulphate of baryta, litharge, and acetate of lead, combined in the proportions named and in the manner specified, when used in combination with cement and water saturated with alum and borax in the formation of slabs of artificial stone, substantially as described.

OTTO E. C. GUELICK.

Witnesses:
DWIGHT C. REXFORD,
CHARLES F. BURTON.